(12) United States Patent
Utsumi

(10) Patent No.: US 6,796,778 B2
(45) Date of Patent: Sep. 28, 2004

(54) FUEL INJECTION PUMP HAVING THROTTLED FUEL PATH FOR FUEL LUBRICATION

(75) Inventor: Yasutaka Utsumi, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/231,022

(22) Filed: Aug. 30, 2002

(65) Prior Publication Data

US 2003/0044288 A1 Mar. 6, 2003

(30) Foreign Application Priority Data

Sep. 3, 2001 (JP) ........................................ 2001-265553
Jun. 5, 2002 (JP) ........................................ 2002-164012

(51) Int. Cl.$^7$ ................................................ F04B 41/06
(52) U.S. Cl. .................... 417/441; 417/295; 417/298; 417/300; 123/446; 92/156; 92/158; 92/86
(58) Field of Search ................................ 417/441, 295, 417/298, 300; 123/446; 92/154, 156, 158, 160, 86

(56) References Cited

U.S. PATENT DOCUMENTS

| | | | | |
|---|---|---|---|---|
| 2,731,299 A | * | 1/1956 | Bramming | 239/590.5 |
| 3,163,394 A | * | 12/1964 | Downin | 251/120 |
| 3,578,881 A | * | 5/1971 | Mowbray et al. | 417/206 |
| 4,884,545 A | * | 12/1989 | Mathis | 123/447 |
| 5,156,531 A | * | 10/1992 | Schmid et al. | 417/295 |
| 5,681,150 A | * | 10/1997 | Kawaguchi et al. | 417/222.2 |
| 5,884,606 A | * | 3/1999 | Kellner et al. | 123/446 |
| 6,230,688 B1 | | 5/2001 | Faix et al. | |
| 6,240,901 B1 | * | 6/2001 | Jay | 123/446 |
| 6,253,734 B1 | * | 7/2001 | Rembold et al. | 123/446 |
| 2003/0010319 A1 | * | 1/2003 | Ishimoto | 123/446 |

FOREIGN PATENT DOCUMENTS

| | | |
|---|---|---|
| DE | 19909329 A | 9/2000 |
| DE | 19941850 A | 3/2001 |
| DE | 19956093 A | 5/2001 |
| EP | 1106884 A | 6/2001 |
| JP | 6-82482 | 11/1994 |

* cited by examiner

Primary Examiner—Justine Yu
Assistant Examiner—Emmanuel Sayoc
(74) Attorney, Agent, or Firm—Nixon & Vanderhye PC

(57) ABSTRACT

In a fuel path through which fuel is supplied to a pump-cam chamber accommodating a drive shaft and a cam for lubrication, an annular throttle fuel path is formed between an inside wall of a cylindrical body and an outside wall of a sphere, when the sphere is in contact with a seat provided inside the cylindrical body. The seat is provided with cuts through which the fuel flows when the sphere is in contact with the seat. Even if foreign material mixed in fuel once blocks a part of the annular throttled path, the blockage of the foreign material is released, when the fuel flow stops and the sphere leaves the seat, so that the fuel is always supplied sufficiently to the pump-cam chamber, resulting in preventing burn-in of the drive shaft and the cam, in particular, at a high engine revolution range.

1 Claim, 7 Drawing Sheets

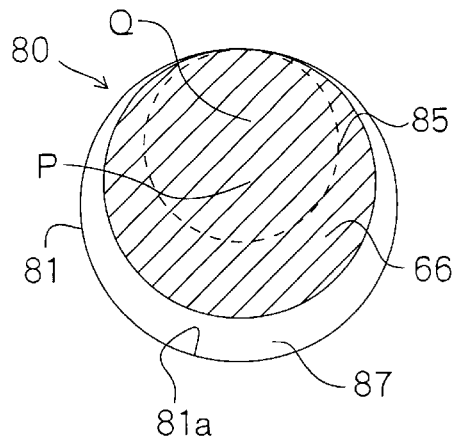
FIG. 8A
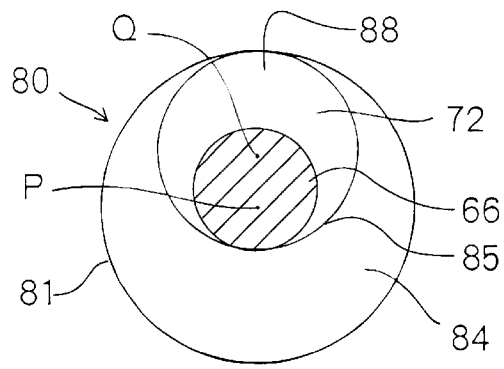
FIG. 8B
FIG. 9
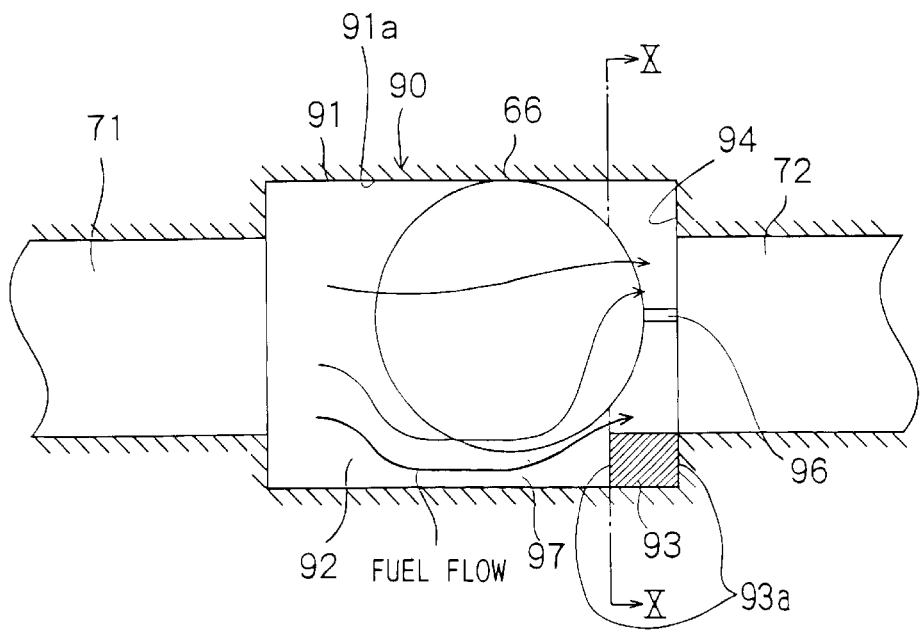

FUEL FLOW

FUEL INJECTION PUMP HAVING THROTTLED FUEL PATH FOR FUEL LUBRICATION

CROSS REFERENCE TO RELATED APPLICATION

This application is based on and incorporates herein by reference Japanese Patent Application Nos. 2001-265553 filed on Sep. 3, 2001 and 2002-164012 filed on Jun. 5, 2002.

FIELD OF THE INVENTION

The present invention relates to a fuel injection pump having a throttled fuel path for fuel lubrication, which is used for an internal-combustion engine (engine).

BACKGROUND OF THE INVENTION

In a cylinder injection type engine in which fuel is injected directly into a cylinder, injection pressure of fuel must be very high for atomizing the injection fuel. Accordingly, the fuel is drawn from a fuel tank by a low-pressure fuel pump such as a feed pump serving as a preliminary pressure source and, then, it is fed under high pressure to a fuel injection valve by a plunger pump.

Generally, the fuel injection pump has a drive shaft driven through a gear or a belt by a crankshaft of the engine. The drive shaft, which is driven by the engine, activates the plunger pump and the feed pump of the fuel injection pump. In this way, pressurization of the fuel is easily achieved by using driving force of the engine.

The feed pump, which is an inner gear type trochoid pump, draws the fuel from the fuel tank and discharges it to a fuel pressurizing chamber for the plunger pump in such a manner that each volume of teeth gaps between inner and outer gears in mesh varies in a trochoid curve. Here, feed pressure equivalent to discharge pressure from the feed pump is stabilized within a predetermined range by a pressure control valve.

The fuel injection pump is provided between the feed pump and a pump-cam chamber which contains the drive shaft and a cam rotating along with the drive shaft with a bypass conduit for fuel lubrication, so that a part of the fuel from the feed pump is fed for lubricating the pump-cam chamber. In the fuel injection pump mentioned above, discharge pressure of the feed pump driven by the engine is responsive to engine revolution, and an amount of the fuel fed from the feed pump to the pump-cam chamber is sufficiently large, when the engine revolution is high, so that engine performance is reliable. However, the feed pressure of the feed pump is relatively low when the engine revolution is low. Even though the fuel discharged from the feed pump to the fuel pressurizing chamber for the plunger pump is relatively small, the fuel is also fed partly for lubricating the pump-cam chamber. Accordingly, the feed pressure is too low to adequately feed the fuel to the fuel pressurizing chamber, which causes a problem of poor engine performance, in particular, when the engine starts up.

To cope with this problem, it is conceivable that the bypass conduit from the feed pump to the pump-cam chamber is provided with a throttle for controlling the feed of lubrication fuel to the pump-cam chamber. However, in a conventional aperture-type throttle as shown in FIG. 11, a foreign material mixed in the fuel is likely to be trapped by the throttle, so that the bypass conduit may be thoroughly blocked off. As the result, the fuel is not sufficiently fed for lubricating and cooling the drive shaft and the cam in the pump-cam chamber, which results in poor reliability due to the possible burn-in of the drive shaft and the cam.

SUMMARY OF THE INVENTION

An object of the present invention is to provide a fuel injection pump in which a fuel path for fuel lubrication is unlikely to be blocked off by a foreign material mixed in the fuel. Another object thereof is to provide a fuel injection pump having a throttled fuel path whose construction is simpler. A further object thereof is to provide a fuel injection pump whose drive shaft and cam are well lubricated without burn-in thereof.

To achieve the above objects, a throttle member is disposed in a fuel path from a preliminary pressure feed source to a pump-cam chamber. The throttle member is composed of a first gap formed between an inside wall and a movable member and a second gap between the movable member and a seat, when the movable member is in contact with the seat. Thereby, even if the foreign material mixed in the fuel is trapped on the first or second gap, only a part of the first or second gap is blocked off and necessary fuel flow can be secured. In addition, the throttle member controls an amount of the fuel with the first gap.

Further, when the fuel flow stops and the movable member leaves the seat, the blockage of the foreign material is completely released. It is preferable that the movable member is a sphere, freely movable within the inside wall and the inside wall is formed in shape of a cylinder. The seat may be formed in shape of a part of a circle or semi-circle. The seat may be provided with cuts through which the fuel flows from an upstream side thereof to a downstream side thereof and which constitutes the second gap.

According to the present invention, the fuel injection pump is highly reliable, in particular, at a high engine revolution range, resulting in the prevention of burn-in of the drive shaft and the cam in the pump-cam chamber.

BRIEF DESCRIPTION OF THE DRAWINGS

The above and other objects, features and advantages of the present invention, will become more apparent from the following detailed description made with reference to the accompanying drawings. In the drawings:

FIGS. 8A and 8B are cross-sectional diagrams taken on line VIIIA—VIIIA and on line VIIIB—VIIIB, respectively, shown in FIG. 7;

FIG. 9 is a schematic cross-sectional diagram illustrating a throttle member of a fuel injection pump according to a third embodiment of the present invention;

DETAILED DESCRIPTION OF THE PREFERRED EMBODIMENTS

A plurality of embodiments of the present invention is explained based on diagrams as follows.

A First Embodiment

A first embodiment of a fuel injection pump for a diesel engine according to the present invention is shown in FIG. 1 to FIG. 6.

Figure 4:
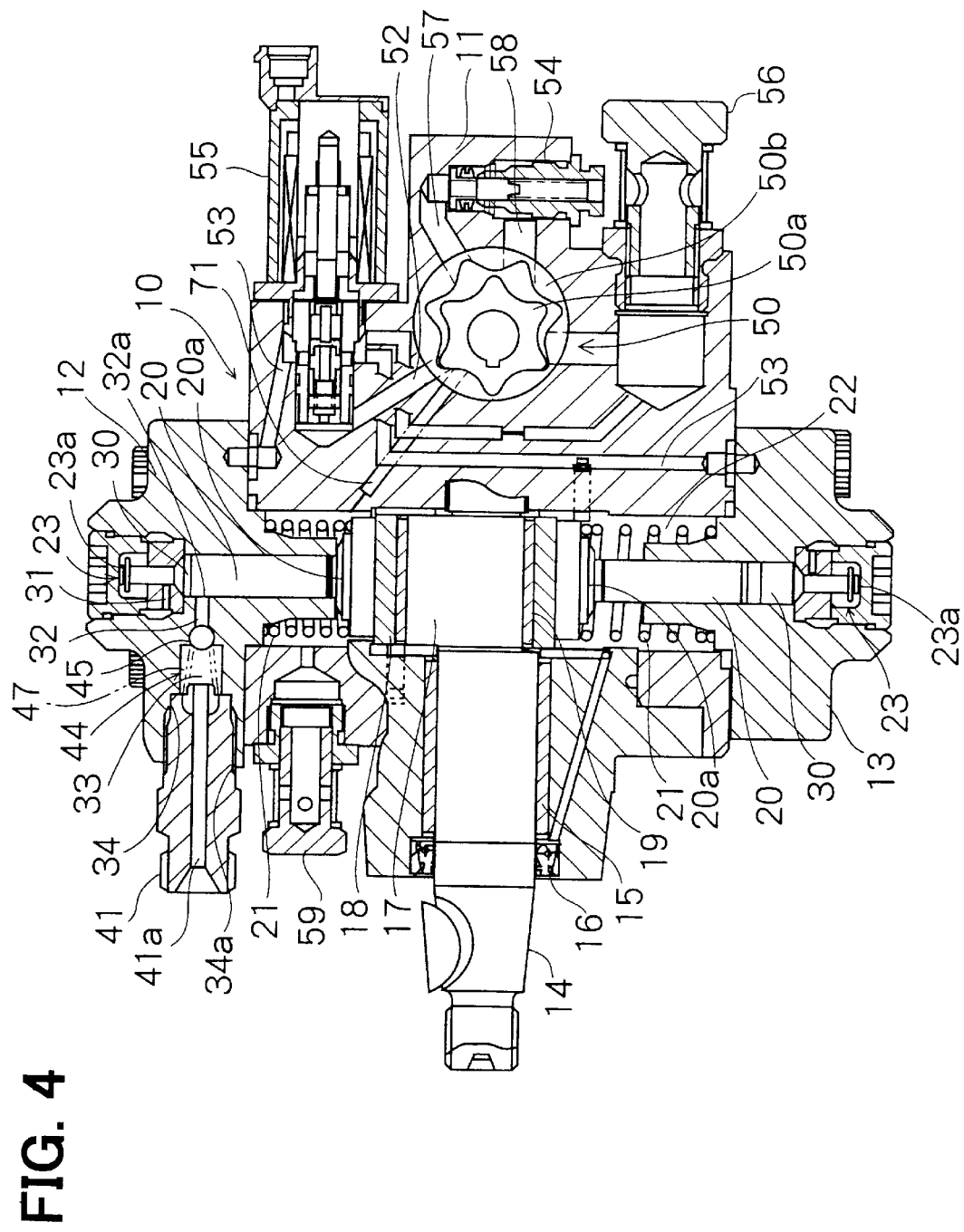
FIG. 4 is a cross-sectional diagram illustrating an entire structure of the fuel injection pump according to the first embodiment of the present invention.

Referring to FIG. 4, a housing of a fuel injection pump 10 comprises a housing body 11 and cylinder heads 12 and 13. The housing body 11 is made of aluminum. The cylinder heads 12 and 13 are made of iron and support slidably and reciprocatingly plungers 20 as pressure generating members. Fuel pressurizing chambers 30 are formed by inside surfaces of cylinder heads 12 and 13, check valves 23, and end surfaces of the plungers 20. In the first embodiment, the cylinder heads 12 and 13 are formed almost in the same shape except positions of screw holes, fuel paths and others. Contrary, the cylinder heads 12 and 13 may be formed thoroughly same.

A drive shaft 14 is rotatably supported, via a journal 15, by the housing body 11. An oil seal 16 seals a gap between the housing body 11 and the drive shaft 14. A cam 17, which is round in cross section, and the drive shaft 14 are formed eccentrically and integrally into one body. The plungers 20 are located on 180 degree opposite sides of the drive shaft 14. A bush 19 is located between a shoe 18 and the cam 17. An outside surface of the shoe 18 at a position opposed to each of the plungers 20 and each end surface of plunger heads 20a are flat and in slidably contact with each other. The drive shaft 14 and cam 17 to be rotated and sliding contact faces between the shoe 18 and the plungers 20 are accommodated within a pump-cam chamber 22 formed by the inside walls of housing body 11 and outside walls of the cylinder heads 12 and 13.

Each of the plungers 20 is reciprocatingly driven by the cam 17 through the shoe 18 along with rotation of the drive shaft 14. The plunger 20 pressurizes fuel introduced into the fuel pressurizing chamber 30 through a check valve 23 from a fuel path 53. The check valve 23, having a valve body 23a, prevents the fuel from flowing reversely to the fuel path 53 from the fuel pressurizing chamber 30. Namely, the check valve 23 is opened in such a manner that the valve body is displaced towards the feed pressurizing chamber 30 when the feed pressure of a feed pump 50 serving as a preliminary pressure feed source, to be described below, becomes higher by a predetermined setting value than pressure of the fuel pressurizing chamber 30.

Each of springs 21 pushes each of the plungers 20 to the shoe 18. Since a contact surface between the shoe 18 and each of the plungers 20 is formed flat, the facing pressure per unit area is smaller. Moreover, the shoe 18 slides with and revolves about the cam 17 without self-rotation according to the rotation of the cam 17.

The cylinder head 12 is provided with a fuel discharge path 32 formed in a straight line and having an opening 32a communicating with the pressurizing chamber 30. The cylinder head 12 is also provided with a fuel chamber 33, whose cross-sectional path area is larger than that of a fuel discharge path 32, on a downstream side of the fuel discharge path 32. The fuel chamber 33 contains a check valve 44. A reception hole 34, whose cross-sectional area is larger than that of the fuel chamber 33, is formed on a downstream side of the fuel chamber 33. The reception hole 34 has a fuel outlet 24a opened to an outside wall of the cylinder head 12. A fuel pressure feed path is constituted by the fuel discharge path 32, the fuel chamber 33 and the reception hole 34. A joint 41 for connecting a fuel line is screwed and accommodated in the reception hole 34. A fuel path 41a formed within the joint 41 communicates with the fuel chamber 33. The fuel path 41a is formed almost in the same straight line with the fuel discharge path 32.

A check valve 44 disposed on a downstream side of the fuel discharge path 32 has a ball-like valve body 45 and a spring 47 which biases the valve body 45 in a valve closing direction. The check valve 44 prevents the fuel from reversely flowing from the fuel chamber 33, which is located on a downstream side of the check valve 44, through the fuel discharge path 32 to the fuel pressurizing chamber 30. The joint 41 is connected through the fuel line to a common-rail (not shown) to which the fuel pressurized in the fuel injection pump 10 is fed for accumulating the fuel. The cylinder head 13 is provided, similarly as the cylinder head 12, with a fuel discharge path (not shown) and with a check valve (not shown) connected to the fuel chamber 33 on a downstream side of the fuel discharge path.

Figure 5:
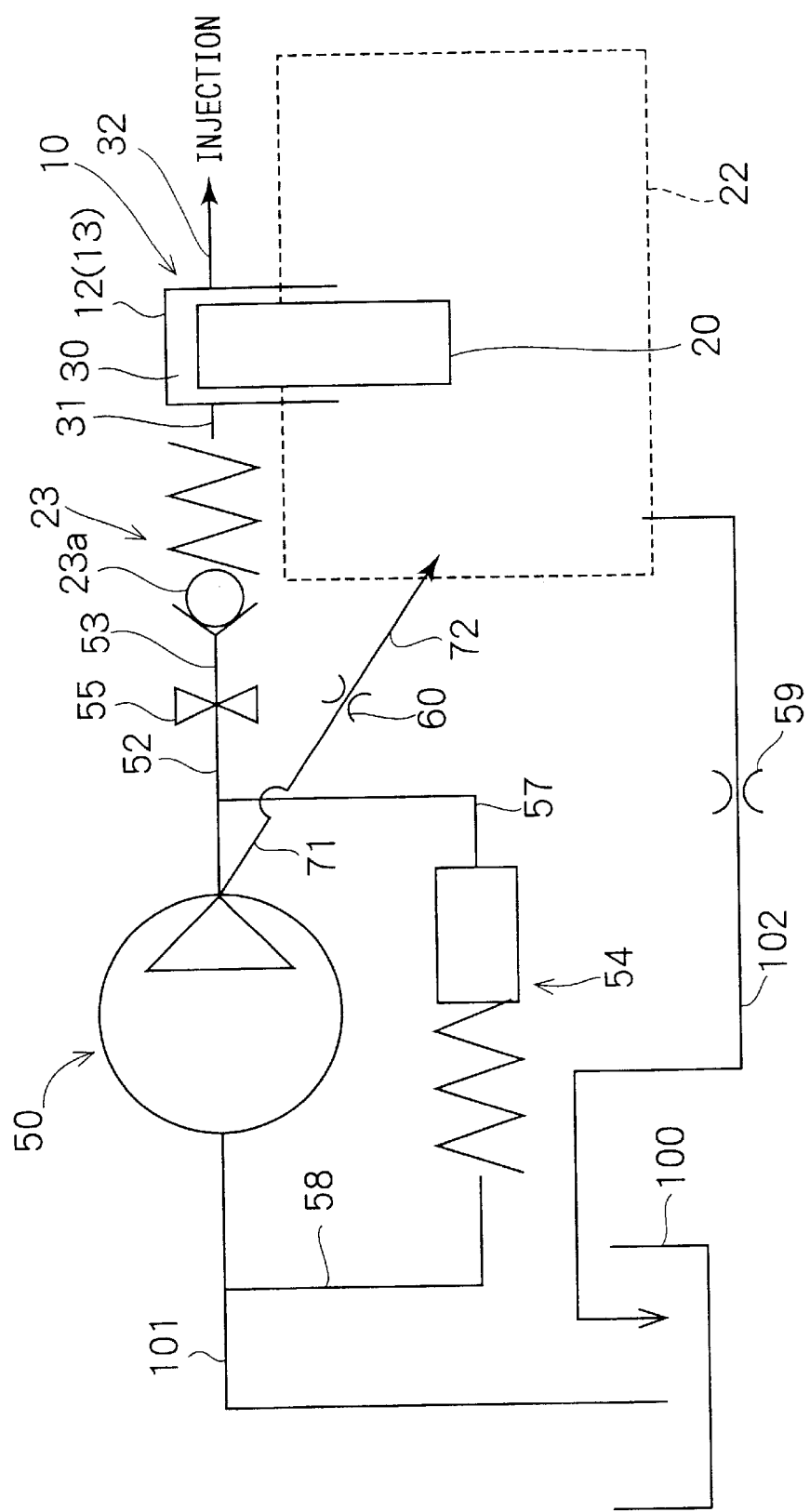
FIG. 5 is a schematic diagram illustrating a structural outline of the fuel injection pump according to the first embodiment of the present invention.

Referring to FIGS. 4 and 5, an inner gear type feed pump 50, as the preliminary pressure feed source, has an outer gear 50b and an inner gear 50a. The feed pump 50 draws the fuel, by the rotation of the inner gear 50a along with the drive shaft 14, from a fuel tank 100 through a fuel path 101 and a fuel inlet 56 described in FIG. 4. The fuel pressurized by the feed pump 50 is sent out to fuel paths 52 and 71. A fuel path 57 branches out from the fuel path 52. When fuel pressure in the feed pump 50 exceeds predetermined pressure, a regulation valve 54 for regulating pressure opens and surplus fuel is returned to the fuel path 101 through a return path 58. In addition, an adjusting electro magnetic valve 55 is provided between the fuel path 52 and the fuel path 53 in the housing body 11. The adjusting electro magnetic valve 55 adjusts an amount of the fuel introduced to the fuel pressurizing chamber 30 through the check valve 23 from the fuel path 53 according to operational status of the engine.

A throttle member 60 is provided between the fuel paths 71 and 72 for controlling an amount of fuel for lubrication within the pump-cam chamber 22. The fuel path 71 is connected to the feed pump 50 and feed pressure of the feed pump acts on the end of the fuel path 72. The fuel path 72 is connected to the pump-cam chamber 22 and the fuel is fed though the fuel path 72 for lubrication within the pump-cam chamber 22. Namely, the fuel paths 71 and 72 are a bypass conduit, which bypasses the fuel path 52 for plunger pressure feed, for feeding fuel to the pump-cam chamber 22 for lubricating the drive shaft 14, the cam 17, and the sliding contact face between the shoe 18 and the plungers 20.

Figure 1:
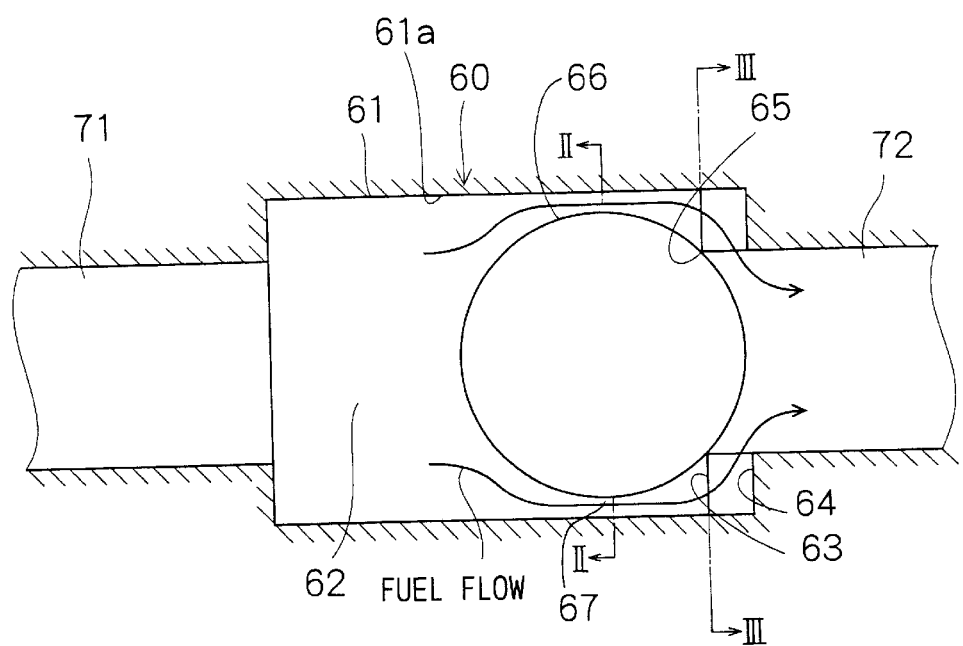
FIG. 1 is a schematic cross-sectional diagram illustrating a throttle member of a fuel injection pump for a diesel engine according to a first embodiment of the present invention.
Figure 2:
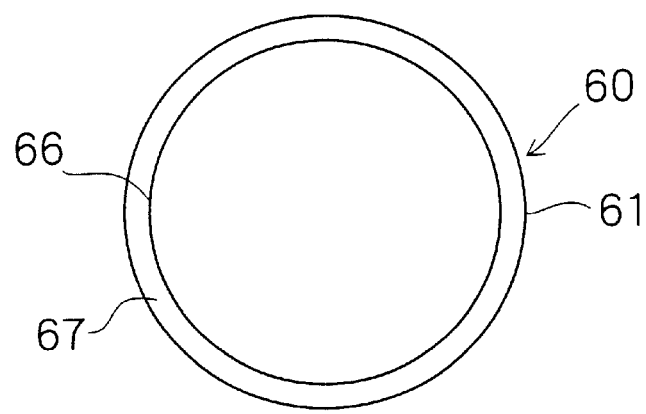
FIG. 2 is a cross-sectional diagram taken on line II—II shown in FIG. 1.
Figure 3:
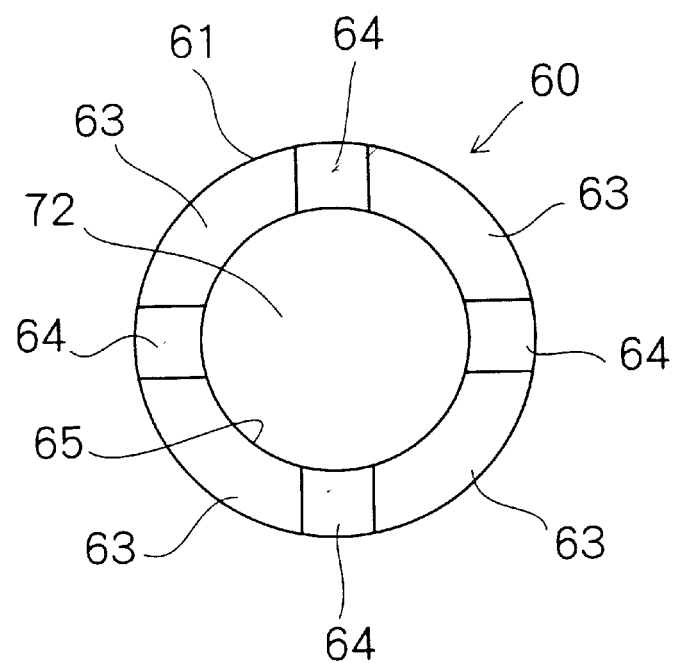
FIG. 3 is a cross-sectional diagram taken on line III—III shown in FIG. 1.

Referring to FIGS. 1, 2 and 3, the throttle member 60 comprises a body 61 having a substantially cylindrical inside wall 61a and a sphere 66 as a ball shaped movable member. The inside wall 61a forms a fuel path 62, in which the sphere 66 is accommodated. The fuel path 62 is connected with the fuel path 71 on an upstream side, namely on a side of the feed pump 50, and with the fuel path 72 on a downstream side, namely on a side of the pump-cam chamber 22. Openings of the fuel path 62 on the downstream and upstream sides are shaped substantially circular. The body 61 is provided radially outside the opening on the downstream side with an axial end wall 63 as shown in FIG. 3, the axial end wall 63 has a plurality of cuts (four pieces of cuts) 64 which are circumferentially spaced at given intervals and through which the fuel path 62 communicates with the fuel path 72. A circumferential edge of the opening on the downstream side at the axial end wall 63 constitutes a seat 65 on which the sphere 66 is seated so that the cuts are formed on the seat 65. When the sphere 66 comes in contact with and is seated on the seat 65 by fuel flow as described by arrows in FIG. 1, an annular throttled fuel path 67 (a first fuel flow gap) is formed between the inside wall 61a of the body 61 and the outside wall of the sphere 66 as shown in FIG. 2. The annular fuel path 67 secures a flow area being narrower than the flow area formed by the above cuts 64 operative as a gap (a second fuel flow gap) between the outside wall of the sphere 66 and the seat 65, thereby controlling the amount of fuel flowing in the fuel path 62. According to the first embodiment, since the inside wall 61a of the body 61, forming the fuel path 62, is formed in shape of a cylinder, the fuel path 67 is formed in shape of a circular ring between the inside wall 61a and the outside wall of the sphere 66. An inside diameter of the fuel path 72, located downstream the seat 65, is smaller than an outside diameter of the sphere 66, so that the fuel flow never brings the sphere 66 to an outside of the fuel path 62.

In the next place, an operation of the fuel injection pump 10 is explained. The cam 17 is rotated along with the rotation of the drive shaft 14 and the shoe 18 is not rotated but revolved about the cam 17. The plungers 20 are reciprocatingly moved, while the contact surfaces of the shoe 18 and the plungers 20 slide with each other, according to the revolution of the shoe 18.

The amount of the fuel discharged from the feed pump 50 is controlled and adjusted by the adjusting electro magnetic valve 55 and the adjusted fuel flows into each of the fuel pressurizing chambers 30 through each of the check valves 23 from each of the fuel paths 53, as each of the plungers 20 descends from a top dead center thereof according to the revolution of the shoe 18. As the plunger 20 ascends toward a bottom dead center thereof from the top dead center, the check valve 23 is closed and the fuel pressure in the fuel pressurizing chamber 30 increases. The check valve 44 is opened as the fuel pressure in the fuel pressurizing chamber increases to a value more than that of the fuel path 41a.

In the cylinder head 12, the fuel pressurized in the fuel pressurizing chamber 30 is sent out from the fuel discharge path 32 through the check valve 44 and the fuel chamber 33 to the fuel path 41a. In the cylinder head 13, the fuel pressurized in the fuel pressurizing chamber 30 is sent out through the fuel paths (not shown) to the fuel chamber 33. The fuel pressurized in both fuel pressurizing chambers 30 converges in the fuel chamber 33 and the fuel is fed to the common-rail through the fuel path 41a. The common-rail accumulates and restores at definite pressure the fuel which is fed from the fuel injection pump 10 and whose pressure is fluctuating. High pressure fuel is supplied from the common-rail to each of injectors (not shown).

Referring to FIGS. 1, 2, 5 and 6, an operation of the throttle member 60 is explained. The sphere 66 is pushed upon the seat 65 by the fuel flow which is introduced from the feed pump 50 through the fuel paths 71 and 62 into the body 61. Here, a gap is formed between the outside of the sphere 66 and the inside wall 61a of the body 61 which forms the fuel path 62. The gap becomes the throttled fuel path 67. The throttled fuel path 67 is formed in shape of the circular ring between the inside wall 61a and the outside wall of the sphere 66 as shown in FIG. 2. The amount of the fuel discharged from the feed pump 50 is controlled by the throttled fuel path 67 and is fed to the pump-cam chamber 22 through the fuel path 72. The throttled fuel path 67 is formed in shape of the circular ring between the inside wall 61a and the outside wall of the sphere 66, so that even if the foreign material mixed in the fuel enter the throttled fuel path 67, only a part of the annular throttled fuel path 67 is blocked with the foreign material. It requires so long time before the material mixed in the fuel thoroughly blocks off the throttled fuel path 67. Consequently, the fuel flows through the throttled fuel path 67 to an extent that portions for which the fuel lubrication is necessary may be prevented from the burn-in.

Further, when the fuel flow in the fuel path 62 stops upon stopping the engine and the like, the sphere 66 pushed upon the seat 65 by the fuel flow leaves the seat 65 so that it may be freely moved within the fuel path 62. This means that width of the gap between the inside wall 61a of the body 61 and the outside wall of the sphere 66 is variable. Consequently, the foreign material trapped in the throttled fuel path 67 is removed, when the sphere 66 is released from the contact with the seat 65, so that the blockage of the throttled fuel path 67 due to the foreign material is cleared up.

As soon as the engine restarts and the fuel flows again within the fuel path 62, the foreign material removed from the throttled fuel path 67 is ejected to the fuel path 72 before the sphere 66 is pushed upon the seat 65 by the fuel flow within the fuel path 62. Therefore, the foreign material trapped in the throttled fuel path 67 never accumulates in the fuel path 62.

Figure 6:
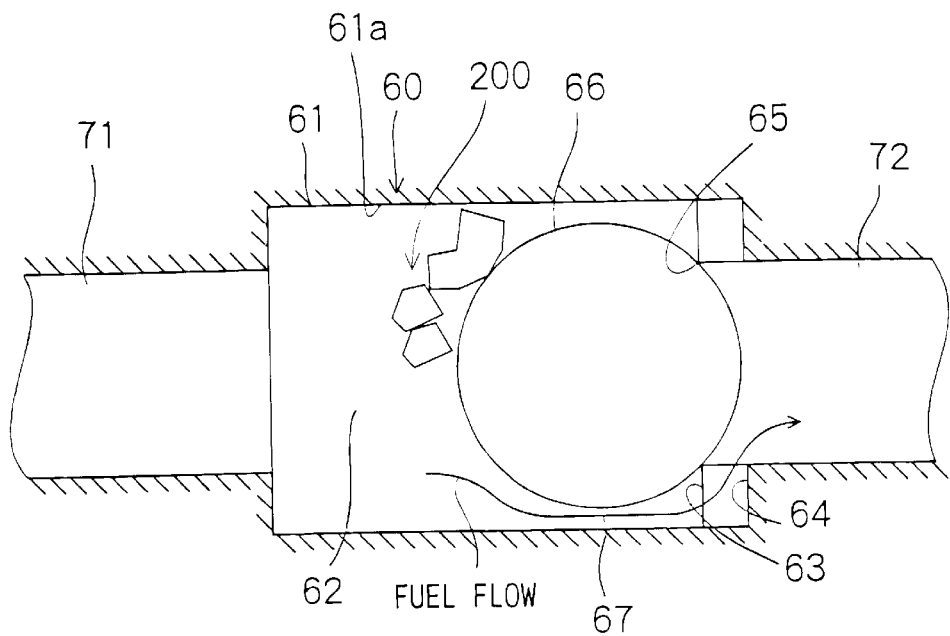
FIG. 6 is another schematic cross-sectional diagram illustrating the throttle member of a fuel injection pump according to the first embodiment of the present invention.

Referring to FIG. 6, if an outside diameter of the foreign material 200, which is mixed in the fuel and entered into the body 61 through the fuel path 71, is longer than the width of the gap between the inside wall 61a of the body 61 and the outside wall of the sphere 66, the foreign material is retained on an upstream side of the sphere 66. When the outside diameter of the foreign material 200 is shorter than the width of the gap between the inside wall 61a of the body 61 and the outside wall of the sphere 66, the foreign material flows out into the fuel path 72 on a downstream side of the sphere 66 through the throttled fuel path 67. Hence, the foreign material never blocks off the throttled fuel path 67, so that an amount of the lubrication fuel flow is sufficient enough to lubricate and cool the drive shaft 14, the cam 17 and the others in the pump-cam chamber 22, which is very effective to suppress the burn-in thereof and to secure higher reliability of the fuel injection pump at a high engine revolution range.

Figure 11:
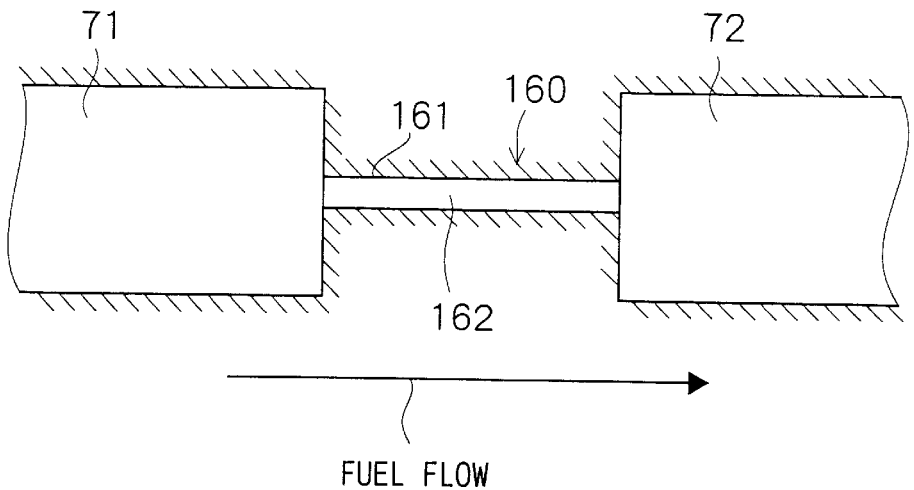
FIG. 11 is a schematic cross-sectional diagram illustrating a throttle member of a fuel injection pump as a prior art.
Figure 12:
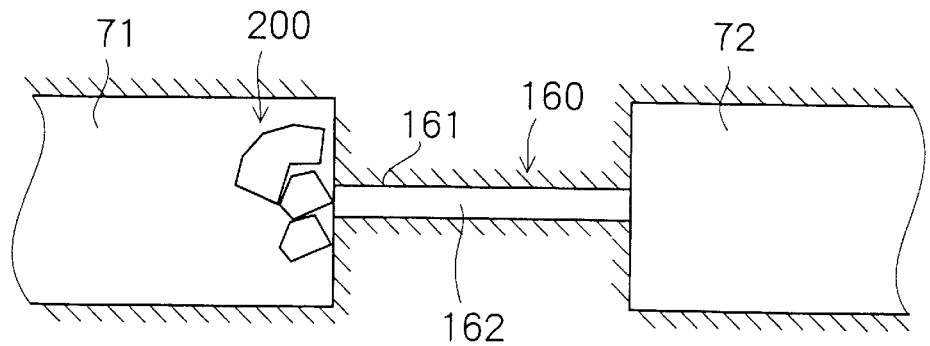
FIG. 12 is another schematic cross-sectional diagram illustrating the throttle member of the fuel injection pump as a prior art.

In case of the conventional throttle member shown in FIGS. 11 and 12, in which the same number as in the first embodiment shown in the FIGS. 1 and 6 is assigned to an equivalent component, a fuel path 71 on a side of the feed pump is linked to a fuel path 72 on a side of the pump-cam chamber through an aperture type throttle 160. The aperture type throttle 160 is constituted by a cylindrical body 161 having a long narrow inner wall path 162. An amount of fuel flow, described by an arrow in FIG. 11, through the aperture type throttle 160 is governed by a cross section area of the inner wall path 162.

Referring to FIG. 12, if an outside diameter of the foreign material 200, which is mixed in the fuel, is longer than an inside diameter of the inner wall path 162, the foreign material 200 is retained on the upstream side of the body 161 and an opening of the inner wall path 162 is blocked. If the inner wall path 162 is blocked off by the foreign material 200, lubrication fuel can not be supplied to the pump-cam chamber and it becomes difficult for the drive shaft, the cam and the others to be lubricated and cooled. As the result, probability of burn-in of the drive shaft, the cam and the others is relatively high, which may result in lower reliability of the fuel injection pump.

Further, in the first embodiment, the throttled fuel path 67 is easily formed by simple combination of the inside wall 61a of the body 61 and the outside wall of the sphere 66 since the sphere 66 is the movable member and the cuts are formed in the seat 65. In the first embodiment, though the downstream opening of the fuel path 62 is formed in the circular shape, it may be shaped oval or other figures, as far as openings, through which the fuel path 62 communicates with the fuel path 72, are formed when the sphere 66 comes in contact with the seat of the downstream opening of the fuel path 62. In the case that the downstream opening of the fuel path 62 is shaped oval or other figures, it is not necessary to further provide the cuts in the seat 65.

Moreover, in the first embodiment, since the inside diameter of the fuel path 72, on the downstream side of the seat 65, is shorter than the outside diameter of the sphere 66, the sphere 66 is prevented from flowing out. Hence, the construction of the throttled bypass conduit is simpler.

In the first embodiment, the amount of the fuel flowing in the fuel path 62 is regulated by the ring shaped gap between the inside wall 61a of the body 61 and the outside wall of the sphere 66 when the sphere 66 is pushed upon the seat. Accordingly, a flow area of the throttled fuel path 67 formed between the inside wall 61a of the body 61 and the outside wall of the sphere 66 is narrower than that of the cuts 64 or the gaps formed between the oval or other shaped opening and the sphere 66 in contact with each other.

A Second Embodiment

Figure 7:
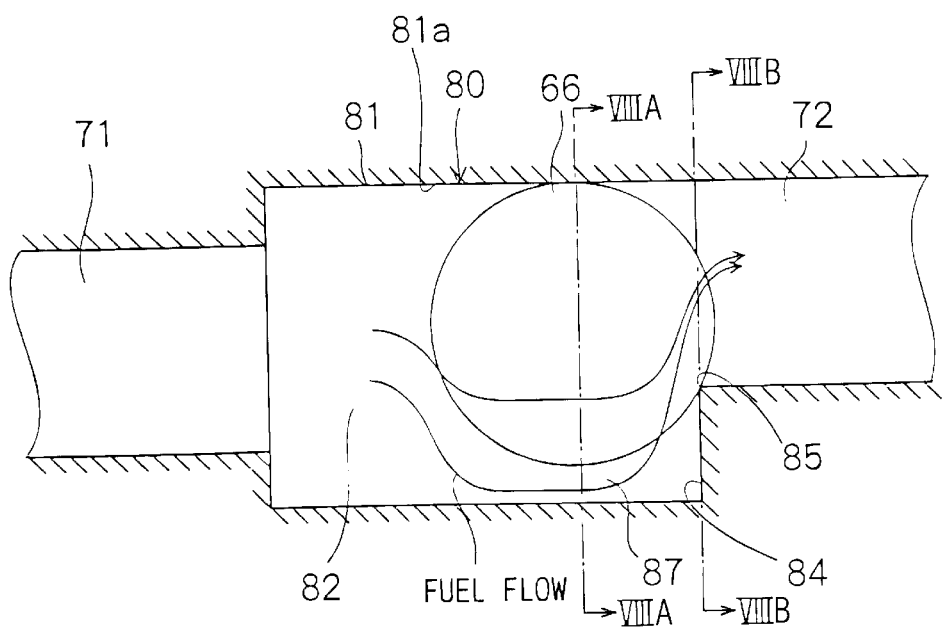
FIG. 7 is a schematic cross-sectional diagram illustrating a throttle member of a fuel injection pump according to a second embodiment of the present invention.

Referring to FIGS. 7 and 8, a second embodiment is explained. The same number as in the first embodiment shown in the FIGS. 1 and 3 is assigned to an equivalent component.

In the second embodiment, as shown in FIG. 7, a throttle member 80 is provided with a sphere 66 and a body 81 having a cylindrical wall 81a forming a fuel path 82. The fuel path 82 is connected with the fuel path 71 on an upstream side, namely on a side of the feed pump, and with the fuel path 72 on a downstream side, namely on a side of the pump-cam chamber. Openings on the upstream and downstream sides of the fuel path 82 are shaped substantially circular. As shown in FIGS. 8A and 8B, the body 81 is provided with an axial end wall 84 to which the fuel path 72 is opened and which is formed almost in shape of a crescent. Periphery of the crescent (the axial end wall 84) constitutes a seat 85, on which the sphere 66 is partly seated to constitute a gap 88 (a second fuel flow gap) between the outside wall of the sphere 66 and the seat 85, as shown in FIG. 8B. There is displacement in a central axis between the fuel path 82 located on the upstream side and the fuel path 72 on the downstream side of the seat 85, as shown in a point P and a point Q FIGS. 8A and 8B. Thereby, as shown in FIG. 7, when the sphere 66 is pushed upon the seat 85 by the fuel flow as described by arrows, a throttled fuel path 87 (a first fuel flow gap) is formed in shape of a crescent between the inside wall 81a of the body 81 and the outside wall of the sphere 66, as shown in FIG. 8A. The flow area of the throttled fuel path 87 is narrower than that of the second gap 88 constituted around the seat 85, thereby controlling an amount of fuel flowing in the fuel path 82.

In the above second embodiment, the throttled fuel path 87 is not thoroughly blocked off by the foreign material mixed in the fuel, so that necessary amount of fuel for lubrication is secured. Accordingly, the burn-in of the components sliding with each other and requiring lubrication by the fuel is prevented, which results in higher reliability of the fuel injection pump, in particular, at the high engine revolution range.

A Third Embodiment

Figure 10:
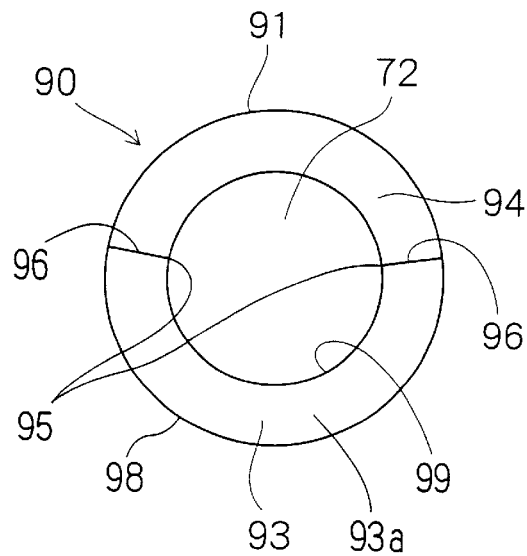
FIG. 10 is a cross-sectional diagram taken on line X—X shown in FIG. 9.

Referring to FIGS. 9 and 10, a third embodiment is explained. The same number as the first embodiment in the FIGS. 1 and 3 is assigned to an equivalent component.

In the third embodiment, as shown in FIG. 9, a throttle member 90 is provided with a sphere 66 and a body 91 having a cylindrical inside wall 91a forming a fuel path 92. The fuel path 92 is connected with a fuel path 71 on an upstream side, namely on a side of the feed pump, and with a fuel path 72 on a downstream side, namely on a side of the pump-cam chamber. Openings on the upstream and downstream sides of the fuel path 92 are almost in shape of a circle. As shown in FIG. 10, the body 91 is provide with an axial end wall 94 to which the fuel path 72 is opened and which is formed almost in shape of a circular ring. A washer 93, which is formed in a letter U or in shape of a semicircular arc ring, is disposed between the axial end wall 94 and the sphere 66. The washer 93 is provided with inclined open end surfaces 96, an outer circumference surface 98, an inner circumference surface 99, and axial end surfaces on upstream and downstream sides 93a. A seat 95 upon which the sphere 66 is pushed is formed at two intersecting points among the inclined open end surfaces, the inner circumference surface 99 and the axial end surface on the upstream side 93a. The outer circumference surface 98 is in contact with the cylindrical inside wall 91a and the end surface on the downstream side is contact with the axial end wall 94. Thereby, as shown in FIG. 9, when the sphere 66 is pushed upon the seat 95 by the fuel flow as described by arrows, two gaps are formed. A first gap, namely a throttle fuel path 97, is formed between the inside wall 91a of the body 91 and the outside wall of the sphere 66, and a second gap is formed between the outside wall of the sphere 66 and the seat 95 of the washer 93. The first gap is set to be narrower than the second gap, thereby being able to control the amount of the fuel flowing the fuel path 92.

In the above third embodiment, when the foreign material is mixed in the fuel, the throttled fuel path 97 is not thoroughly blocked off by the foreign material. Accordingly, burn-in of the sliding surfaces of the components requiring lubrication by the fuel unlikely occurs, resulting in higher reliability at high engine revolution.

In the embodiments described above, the throttled member is provided at the fuel path, which bypasses the fuel path for the plunger pressure feed and through which the fuel is fed from the feed pump into the pump-cam chamber. However, the throttle member may be provided in any fuel path in the pump housing for controlling the amount of fuel.

What is claimed is:

1. A fuel injection pump comprising:
    a drive shaft;
    a preliminary pressure feed source for drawing, preliminarily pressurizing and discharging fuel according to the rotation of said drive shaft;
    a cam rotatable together with said drive shaft;

a pressure generating member movable reciprocatingly according to the rotation of said cam for further pressing and feeding under high pressure the fuel discharged from said preliminary pressure feed source;

a pump-cam chamber which accommodates said drive shaft and said cam;

a fuel path through which a part of the fuel discharged from said preliminary pressure feed source is supplied to said pump-cam chamber; and a throttle member arranged within said fuel path, said throttle member having an inside wall within which said part of the fuel flows, a movable member disposed movably within said inside wall, and a seat which comes in contact with said movable member to be moved by said part of the fuel, wherein, when said movable member is in contact with said seat, an outer surface of said movable member and an inner surface of the inside wall form a first fuel flow gap therebetween and said outer surface of said movable member and said seat form a second fuel flow gap therebetween, so that said part of the fuel flows from an upstream side of the movable member via the first and second fuel flow gaps to a downstream side thereof when said movable member is in contact with said seat, wherein a fuel flow area defined by said first gap has a narrower cross-sectional area than said second gap has, thereby serving to control a flow amount of said part of the fuel flowing through said fuel path and said throttle member, wherein said movable member is formed in a shape of a ball, wherein said inside wall is formed in a shape of a cylinder and said seat is formed in a shape of a part of a circle, and wherein a central axis of said circle is displaced radially from an central axis of said cylinder.

* * * * *